United States Patent Office 3,345,264
Patented Oct. 3, 1967

3,345,264
METHODS OF SUPPRESSING ANXIETY EMPLOYING SODIUM AND IRON SALTS OF PYRROLIDONE CARBOXYLIC ACID
Gustave Marie Joseph Bocher, deceased, late of Paris, France, by Dominique Bocher, heir and attorney-in-fact, Paris, France
No Drawing. Filed Oct. 1, 1964, Ser. No. 400,954
Claims priority, application France, June 3, 1960, 829,133
The portion of the term of the patent subsequent to Apr. 13, 1982, has been disclaimed.
4 Claims. (Cl. 167—65)

The present invention relates to carboxylic pyrrolidone acid and its derivatives as new psychoequilibrating drugs.

This application is a continuation-in-part of copending patent application Ser. No. 113,606, filed May 31, 1961, issued as Patent No. 3,178,347, Apr. 13, 1965.

Pyrrolidone carboxylic acid is a white crystalline substance which is soluble in water and alcohol. It is also known by the following designations: monocarboxylic pyrrolidone acid, 5-oxopyrrolidone-2-carboxylic acid, or 5-pyrrolidone-2-carboxylic acid. Its empirical formula is $C_5H_7O_3N$. Its molecular weight is 129; N=10.85%, C=46.51%, H=5.42% and O=37.20%.

Its structural formula is

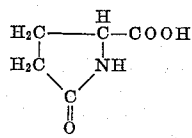

It is customarily obtained by dehydration of glutamic acid at a temperature in excess of 150° C.

It is identified by acidimetric titration and by measuring the nitrogen content, which must satisfy the specification given above.

The derivatives of carboxylic pyrrolidone acid are usually used instead of the acid per se. These derivatives are pharmaceutically acceptable metal salts of the acid and the reaction products of the acid with other pharmaceutically acceptable compounds. These derivatives have the general formula

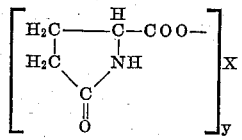

wherein X is a pharmaceutically acceptable moiety and y is the valence of X in the reaction product with the pyrrolidone carboxylic acid. When X is a metal ion, the reaction product is characterized as a metal salt. The useful metal salts are those of pharmaceutically acceptable metal ions, of which $Ca^{++}$, $Li^+$, $Mg^{++}$, $Na^+$, $K^+$, $Co^{++}$, $Mn^{++}$, $Fe^{++}$, $Zn^{++}$, $Cu^{++}$, $Al^{+++}$ and $Bi^{+++}$, are illustrative. Illustrative of the "X" moieties where the bonds between the pyrrolidone carboxylate moiety, and the X moiety are considered primarily covalent in nature, and wherein y is 1, are —$CH_2CH(OH)CH_2OH$ (glycerine),
—$CH_2CH_2OH$ (ethylene glycol),
—$NHC(COOH)HCH_2CH_2SCH_2$ (methionine),
—$NHC(COOH)H(CH_2)_4NH_2$ (lysine),
—$N(CH_3)(CH_3)(CH_3)CH_2OH$ (cholin), and
Betaine (1:1 reaction product).

The preferred compounds include the calcium pyrrolidone carboxylate, which is easily soluble in water, and has the empirical formula $C_{10}H_{12}O_6H_2Ca$ and a molecular weight of 296 (N, 9.45%; C, 40.54%; H, 4.05%; O, 32.43%; and Ca, 13.51%). It is obtained by the action of carboxylic pyrrolidone acid on calcium carbonate, reacting in stoichiometric quantities. The glycerine pyrrolidone carboxylate is another preferred compound. It has the empirical formula $C_8H_{13}O_5N$, and the molecular weight of 203 (N, 6.89%; C, 47.29%; H, 6.40%, and O, 39.40%). It is formed by reaction of the acid with glycerine. It is preferably reacted with excess glycerine, resulting in the production of glycerine pyrrolidone carboxylate in a glycerine solution. This solution may be used for administering the pyrrolidone carboxylate to the patient.

The compounds may be identified by means of chemical analyses complying with the specifications detailed above. It may be noted, however, that when glycerine pyrrolidone carboxylate is obtained in glycerine solution form, the proportion of glycerine contained in this substance must be allowed for when conducting identification tests.

Heretofore, pharmacopeia knew of three groups of compounds revealing an illogical and often contradictory association, either because of the way these drugs act or because of their secondary effects.

These three drug groups are the following:
(1) Sedatives.
(2) Phsychotonics, a typical example of which is glutamic acid.
(3) Euphorizers, or psychostimulants, among which may be included the family of amphetamines.

The sedative effect of the drugs currently employed is often accompanied by a hypnotic effect which runs counter to the psychotonic effect; other drugs provoke psychoasthenia which in turn leads to anxiety phenomena. In most cases, these drugs bring about a state which may be qualified as one of dulling the patient, that is to say that the latter becomes completely indifferent to his environment, a condition which is in flat contradiction to the desired psychotonic effect.

The psychotonics are all not only psychic but also psychomotive excitants, that is to say, they produce the opposite of a sedative effect.

Euphorizers are drugs which have very powerful effects and are also psychomotive excitants the effects of which can reach the point of toxicity and can provoke severe insomnia and often also metal confusion. These are also properties having the opposite of a sedative effect or even of a psychotonic effect.

Studies undertaken within the scope of the present invention have revealed that pyrrolidone carboxylic acid and its derivatives (which are meant to be included in the term "the pyrrolidone carboxylic acid compound") possess what may be termed a psychoequilibrating action by virtue of the fact that the following properties are combined.

(1) In comparison with sedatives, the pyrrolidone carboxylic acid compound improves psychism, suppresses anxiety and fights sleeplessness; however, in contradistinction to sedatives, it has no ataraxic effects so that sleep is thereby rendered physiologically normal.

(2) Like conventional psychotonics, the pyrrolidone carboxylic acid compound sharpens the memory and improves intellectual efficiency, but, contrarily to the former drugs, does not produce disorderly psychic excitation.

(3) Like the euphorizers, though to a much lesser extent, the pyrrolidone carboxylic acid compound assists physical and especially mental effort, and, contrarily to euphorizers, not only does not produce any psychomotive excitation but may also be said to restore the neuro-psychic equilibrium to normal.

(4) The pyrrolidone carboxylic acid compound further possesses powerful anti-toxic properties, notably reflected by the protection it affords the nervous system and the hepatic system.

A toxicological study has shown that the pyrrolidone carboxylic acid compounds are exempt from any form of toxicity, be it acute or chronic.

The doses employed averaged 6 gr. per day per person and were often amply exceeded without disadvantage.

The properties of the pyrrolidone carboxylic acid compounds described above were ascertained by experiments made on animals and also from clinical observations.

Experiments undertaken with glycerine pyrrolidone carboxylate have produced the following results:

(a) Experiments on albino rats have revealed its protective action against toxic substances affecting the nervous system. This was ascertained by means of intoxication tests using ammonium ion and potassium ion.

Both the results obtained and the manner in which glycerine pyrrolidone carboxylate acts are essentially at variance with the other amino acids and in particular with glutamic acid (which was used for reference purposes).

The hepatic protection it offers against ethyl alcohol was also noted.

(b) The psychoequilibrating properties were established quite clearly and in continuous fashion in the course of clinical tests on more than fifty cases involving widely different subjects (children, adults and elderly people of both sexes, all having greatly differing clinical charts).

In addition, experiments relating to calcium pyrrolidone carboxylate were conducted under the following conditions:

The calcium pyrrolidone carboxylate was administered in the form of drinkable phials (4 g. per day), pills (3 gr. per day), intravenous injections (0.68 gr. per day). The pyrrolidone carboxylate derivatives generally may also be administered by conventional methods, i.e. orally or by injection. They are compatible with many of the usual pharmaceutical carriers.

The effects of the drug were checked by means of laboratory tests made on blood serum, notably by a series of electrophoresses.

This study has brought to light the favorable effects on alcoholics; indeed, it is well known that such individuals sustain hepatic repercussions which are notably reflected by a constant and considerable rise in the gamma-globulin content of their blood serum. Following treatment with calcium pyrrolidone carboxylate, these patients showed a very rapid drop of the gamma-globulin content down to normal, thereby confirming experiments made on animals and revealing the hepatic protection afforded in cases of intoxication by ethyl alcohol.

A considerable improvement in the psychism of the patients was noted.

By way of example, a number of clinical observations are given below:

*A young heterosygot (age two).*—His brother is a well-balanced child and works well at school. Philippe, on the other hand, though not strictly-speaking lazy, is muddle-headed, absent-minded, agitated and wakes up screaming almost every night.

A month's treatment with glutamic acid taken at the rate of ten 0.40 gr. pills every 24 hours gave negative results. Various sedatives tried out proved ineffective or made the child sleepy almost all day.

It was then decided to give the child a teaspoonful of glycerine pyrrolidone carboxylate before each of the three principal meals. At the beginning of the third day of treatment, an appreciable improvement was noted in the boy's sleep, which became quieter. He began to wake up in the morning feeling alert and no longer sleepy as he had been when he was taking sedatives. After a month had elapsed, his environment (brother and parents) noticed his greatly improved behavior; he stopped being moody and no longer evinced signs of nervousness or instability. At school, however, although his work appears to be more orderly, he does not seem to be making any progress outside of composition and drawing. His father has noted that, for the first time, he finishes the drawings he begins.

Treatment has been under way for a month and is to be continued during the school holidays.

A twelve year old girl was examined eight months after she had undergone extremely severe though entirely successful abdominal surgery. Despite the success of the operation, however, the child has since been nervous, asthenic and is getting poor reports from school. She also suffers from insomnia and is depressed and haunted by thoughts of death.

A month's treatment with glutamic acid administered at the rate of 4 gr. a day (ten 0.40 gram pills every 24 hours) brought no improvement other than at school. Indeed, even this improvement at school soon stopped when the treatment was broken off. A month after the end of this treatment this young patient was given glycerine pyrrolidone carboxylate (a teaspoon in a glass of water before each meal). A distinct improvement occurred by the end of the first week's treatment, and after a month had elapsed the child was absolutely normal; there was clear progress at school and she slept well without nightmares and was no longer haunted by the thought of death. She is gay and playful and gives the impression of a healthy, well-balanced child. The treatment was interrupted after a month and a half; a tendency for the old trouble to reappear was then noted, whereupon the treatment was resumed and continued for three months. The troubles have not reappeared since.

A six year old girl showed troubles stemming from her character; nervousness, fits of temper for futile reasons, fear and agitation at night.

A month's treatment was begun at the rate of three teaspoonfuls every 24 hours. At the end of the first week of treatment, a distinct improvement was observed in the child's behavior (quieter and less agitated) and also in her sleep, which soon reverted to normal.

It should be noted that not the slightest hint of depression was observed in this child; on the contrary, notwithstanding the fact that she had tended to be rather uncommunicative by nature, she became very gay and playful.

This little girl, who is in excellent health in every other way, has become very active not only in the games she plays but also in her conduct at school.

The administration of calcium pyrrolidone carboxylate, made chiefly to study the absorption of calcium by the organism, has also been found to produce psychoequilibrating and anti-toxic effects.

(1) A four and one-half year old child suffering from osteoporosis not only had its bone structure improved but is also developing normally from the mental standpoint since the treatment was begun.

(2) Calcium pyrrolidone carboxylate, when administered to alcoholics suffering from multiple fractures, has always led to a lowering of the gamma-globulin content—an unmistakeable indication of disintoxication.

The aforedescribed desirable results of a psychoequilibrating nature obtained in which manifestations of neurotic anxiety are alleviated or eliminated by treatment with the specified derivatives of pyrrolidone carboxylic acid are attributed to the moiety

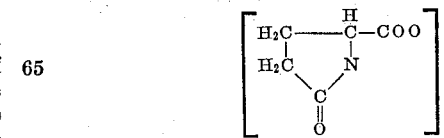

and are obtained when using the acid per se, or its derivatives. The derivatives of practical importance are those that are pharmaceutically acceptable, and particularly those defined as "X" hereinbefore.

While I have disclosed several embodiments of the present invention, it is to be understood that these embodiments are given by example only and not in a limit-

I claim:

1. A method of suppressing anxiety in animals suffering therefrom which comprises the step of administering to such animals an effective amount of a compound selected from the sodium and iron salts of pyrrolidone carboxylic acid.

2. The method as set forth in claim 1, wherein said compound is administered to a human.

3. The method of claim 2 wherein said compound is the sodium salt.

4. The method of claim 2 wherein said compound is the ferrous salt.

References Cited

UNITED STATES PATENTS

| | | | |
|---|---|---|---|
| 2,807,626 | 9/1957 | Skelly | 260—326.3 |
| 3,002,978 | 10/1961 | Bocher | 260—326.2 |
| 3,178,347 | 4/1965 | Bocher | 167—65 |
| 3,255,190 | 1/1966 | Broh Kahm | 260—326.3 |

ALBERT T. MEYERS, *Primary Examiner.*

SAM ROSEN, *Examiner.*

S. J. FRIEDMAN, *Assistant Examiner.*